(12) United States Patent
Cudak et al.

(10) Patent No.: US 10,592,659 B2
(45) Date of Patent: Mar. 17, 2020

(54) COMPUTING DEVICE APPLICATION PROGRAM BEHAVIOR PROFILE

(71) Applicant: Lenovo Enterprise Solutions (Singapore) PTE. LTD., New Tech Park (SG)

(72) Inventors: Gary David Cudak, Wake Forest, NC (US); John Scott Crowe, Durham, NC (US); Jennifer J. Lee-Baron, Morrisville, NC (US); Nathan J. Peterson, Oxford, NC (US); Amy Leigh Rose, Chapel Hill, NC (US); Bryan L. Young, Tualatin, OR (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 1012 days.

(21) Appl. No.: 15/055,075

(22) Filed: Feb. 26, 2016

(65) Prior Publication Data

US 2017/0249560 A1   Aug. 31, 2017

(51) Int. Cl.
*G06F 15/18* (2006.01)
*G06F 21/50* (2013.01)
*G06F 21/55* (2013.01)
*G06F 21/57* (2013.01)

(52) U.S. Cl.
CPC .......... *G06F 21/50* (2013.01); *G06F 21/552* (2013.01); *G06F 21/554* (2013.01); *G06F 21/57* (2013.01)

(58) Field of Classification Search
CPC .......... G06F 21/00; G06F 21/56; G06F 21/57
USPC ...................................... 706/15, 45
See application file for complete search history.

(56) References Cited

U.S. PATENT DOCUMENTS

2010/0031308 A1*   2/2010   Khalid .................. G06F 21/51
                                                                726/1

* cited by examiner

*Primary Examiner* — David R Vincent
(74) *Attorney, Agent, or Firm* — Kunzler Bean & Adamson, PC; Bruce R. Needham

(57) ABSTRACT

After first installation of an application program on a computing device, the computing devices monitors a behavior of the application program for a period of time and then builds a behavior profile of the application program from the behavior. After the period of time has elapsed, such as specified period of time, the computing device may prevent the application program from deviating from the behavior profile. After the period of time has elapsed, such as when an update or patch to the application program has been applied or installed, the computing device may continue to monitor the behavior of the application program, and in response to determining that the behavior of the application program after the period of time deviates from the behavior profile, perform an action with respect to the application program.

20 Claims, 3 Drawing Sheets

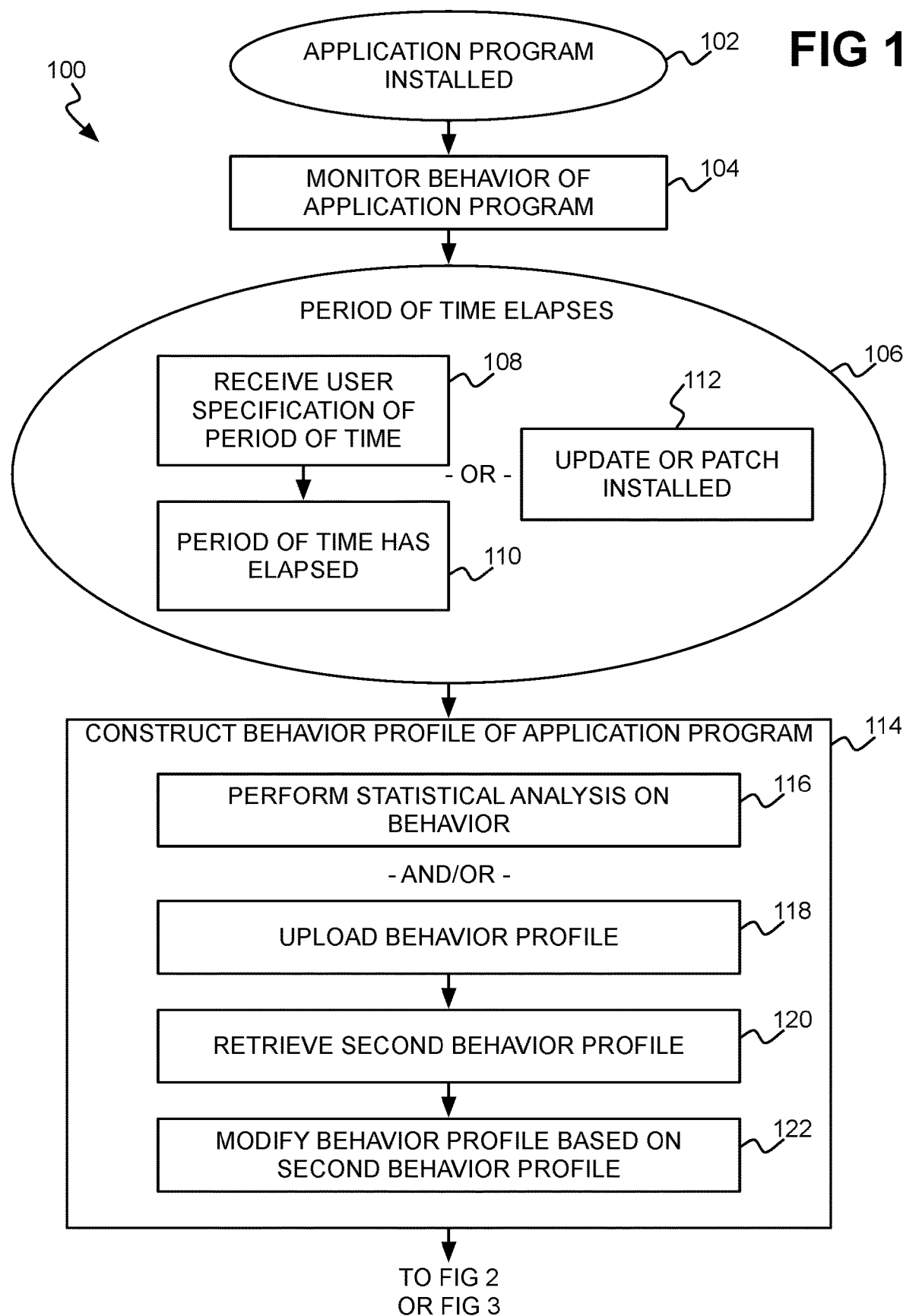

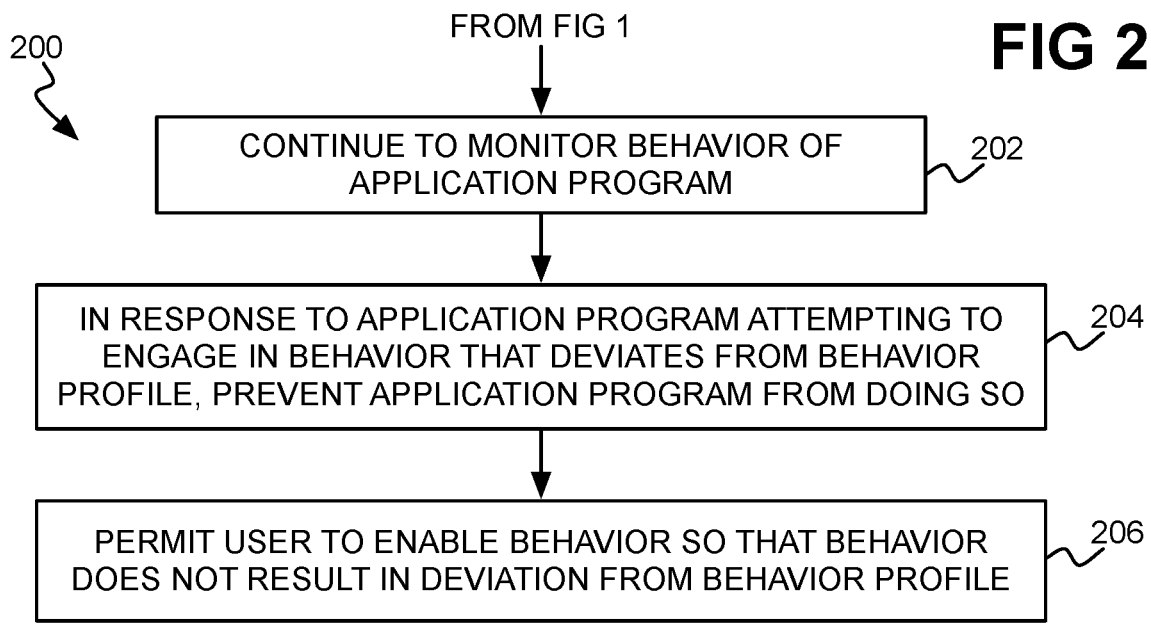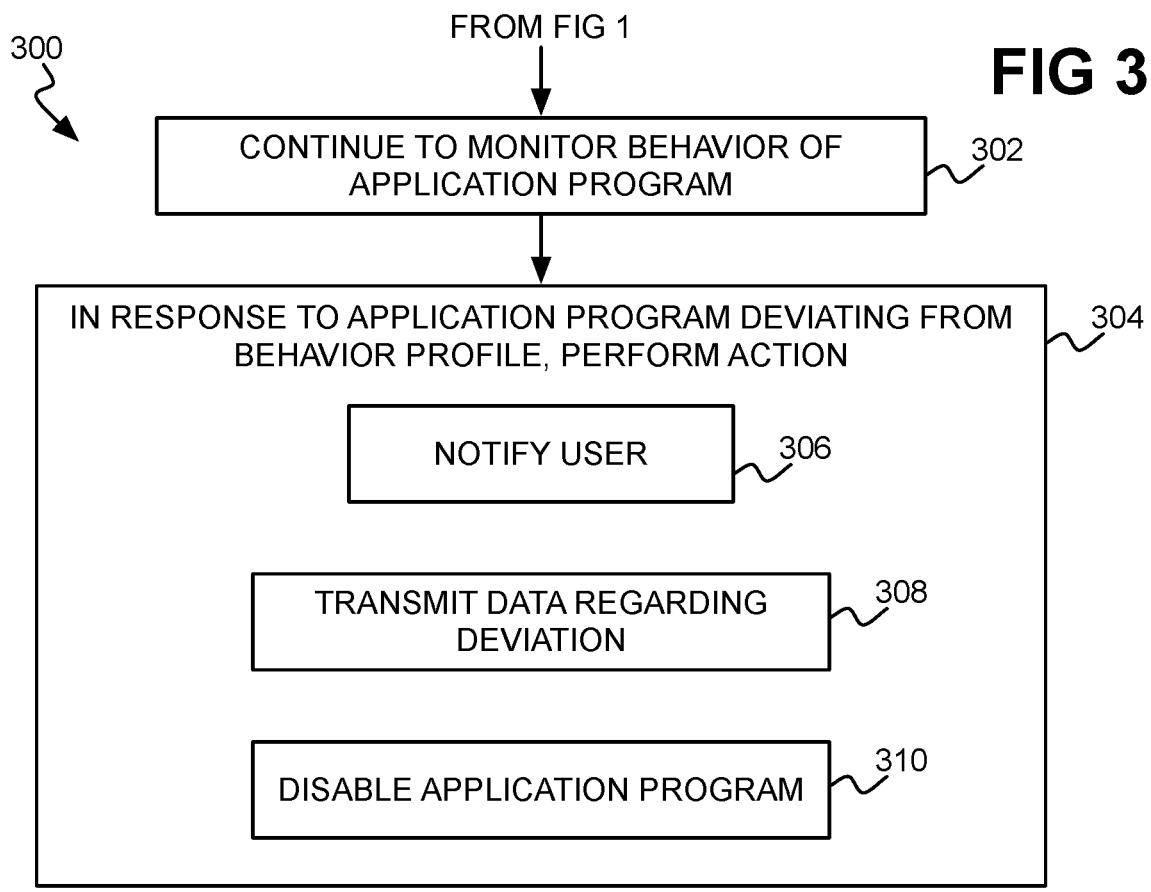

COMPUTING DEVICE APPLICATION PROGRAM BEHAVIOR PROFILE

BACKGROUND

One increasingly popular type of computing device is the mobile computing device, particularly the smartphone. In addition to performing typical mobile phone telephony functionality, such as making and receiving phone calls and sending and receiving text messages, smartphones are effectively small computers, permitting their users to install and run application programs, which are generally referred to as "apps" in the context of smartphones. Apps are increasingly popular; many users have tens or even hundreds of apps installed on their smartphones.

SUMMARY

An example method includes, after first installation of an application program on a computing device, monitoring, by the computing device, a behavior of the application program for a period of time and building a behavior profile of the application program from the behavior. The method includes, after the period of time, performing one of the following. First, the computing device can prevent the application program from deviating from the behavior profile. Second, the computing device can continue to monitor the behavior of the application program, and in response to determining that the behavior of the application program after the period of time deviates from the behavior profile, perform an action with respect to the application program.

An example non-transitory computer-readable data storage medium storing computer-executable code performable by a computing device to perform a method. The method includes, after first installation of an application program on the computing device, monitoring a behavior of the application program for a specified period of time. The method includes, after the specified period of time has elapsed, constructing a behavior profile of the application program based on the behavior that has been monitored for the specified period of time. The method includes, after the behavior profile has been constructed, preventing the application program from engaging in behavior that deviates from the behavior profile.

An example computing device includes hardware resources, including a processor. The computing devices a non-transitory computer-readable data storage medium storing computer-executable code that is executable by the processor. The code is executable by the processor to, after first installation of an application program on the computing device, monitor a behavior of the application program. The code is executable by the processor to, after an update or patch of the application program has been applied or installed, construct a behavior profile of the application program from the behavior that has been monitored until the update or patch was applied or installed. The code is executable by the processor to, after the behavior profile has been constructed, in response to determining that the behavior of the application program after the update or patch has been applied or installed deviates from the behavior profile, perform an action with respect to the application program.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a flowchart of an example method for monitoring the behavior of an application program and constructing a behavior profile from the monitored behavior.

FIG. 2 is a flowchart of an example method for enforcing application program behavior relative to a behavior profile in a proactive manner.

FIG. 3 is a flowchart of an example method for performing an action subsequent to application program behavior deviating from a behavior profile in a reactive manner.

DETAILED DESCRIPTION

Figure 4:
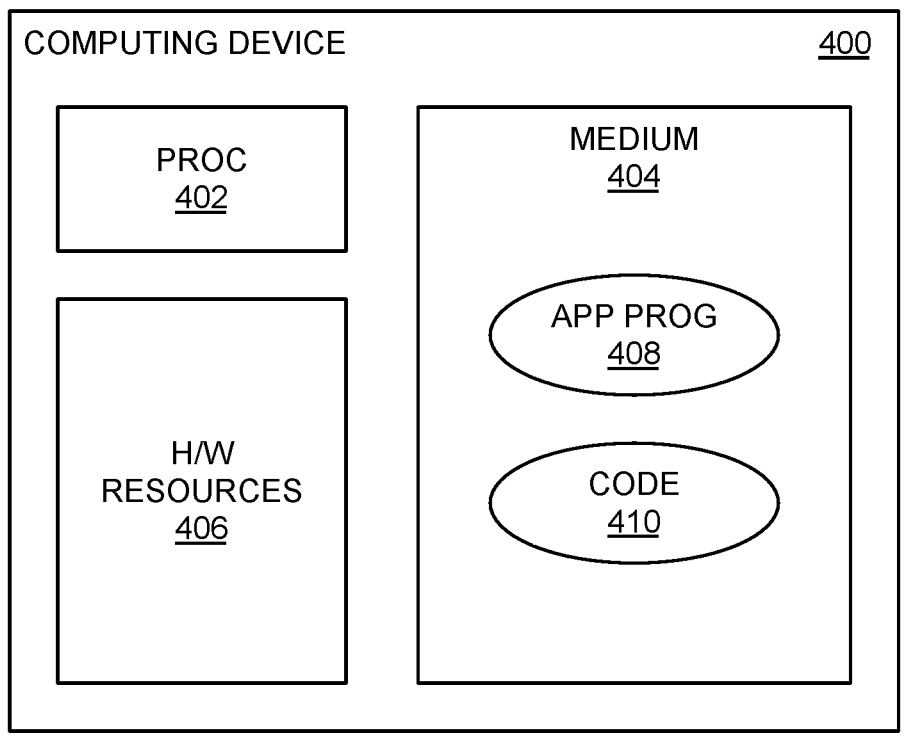
FIG. 4 is a diagram of an example computing device.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, computing devices like smartphones permit users to install and run many different types of application programs, or "apps." Unfortunately, with the increasing number of different application programs available, the potential for rogue application programs, or "malware," to be installed on computing devices has increased. Such malware generally performs functionality detrimental to the computing device on which it is running, to the user of the computing device, and/or to a different computing device. For example, a rogue application program may attempt to crash the computing device purposefully, may attempt to steal confidential data of the computing device's user, or may attempt in unison with other computing devices to perform an attack on a server computing device.

To avoid the chance for rogue application programs from being installed on the computing devices of unsuspecting users, many computing device manufacturers have created specific "stores" from which users are recommended to download application programs, or which are the only source from which users can download such programs. Developers of application programs thus have to provide their application programs to the maintainers of the store, which vet the programs for security and other purposes before permitting the programs from being downloaded and installed. However, it is a Herculean task to properly and successfully vet every application program that is submitted to a store. Malware still has the potential to sneak past even the most thorough of application program store maintainers.

This problem is exacerbated by a relatively new type of rogue application program, which is referred to as a "gremlin" application program. Such an application program is initially a legitimate application program providing useful functionality for the users who download the program onto their computing devices. However, at some point in the future, the owner of the application program may change, or the developer of the program may become nefarious. As a result of a patch or update to the program, or by triggering latent functionality that has been within the program since installation, the application program can become rogue, and perform undesired functions. Insofar as the users of the application program may have begun to trust the program due to its proper and useful functioning for weeks, months, or even years, an application program that becomes rogue later is an especially insidious problem.

Disclosed herein are techniques that ameliorate the shortcomings described above. When an application program is first installed on a computing device, its behavior is monitored for a period of time. The period of time may be a specified period of time, such as by the user, or may elapse when an update or patch to the application program has been installed. At that time, a behavior profile of the application program is built or constructed from the monitored behavior. In a proactive implementation, the application program is not permitted to deviate in behavior from the behavior profile. In a reactive implementation, if the application program does deviate in behavior from the behavior profile, an action is performed, such as notifying the user as to the deviation in behavior, and potentially suspending the application program.

As an example, a user may download a photo storage application program that is advertised as automatically uploading the user's photos, as he or she takes them, to a central server specified by the user. Over the first few months, the application program does exactly this, and a behavior profile of the program is constructed that determines that captured photos are being uploaded automatically to a particular server. Thereafter, though, the application program begins to send not only the photos, but all data on the computing device, to an entirely different server. For example, an update to the application program may have been installed, or latent functionality of the program may be triggered after the passage of a period of time. In the proactive implementation, such behavior is prevented from occurring. In the reactive implementation, as soon as the behavior occurs, the user may be notified, and the application may be suspended from running on the computing device.

FIG. 1 shows an example method 100 for monitoring the behavior of an application program and constructing a behavior profile from the monitored behavior. The method 100 is performed by a computing device on which an application program is to be installed. For example, the computing device may be a mobile computing device, such as a smartphone. The computing device may be another type of computing device as well, such as a desktop or laptop computer, a tablet computing device, and so on.

An application program is installed on the computing device (102). For example, a user may download the application program from an "app store" in the case of a mobile computing device like a smartphone. As another example, the user may download the application program from a web site over the Internet. The user downloads the application program in general because the application program is advertised to provide functionality that the user would like to have on his or her computing device.

For a period of time after the application program is installed on the computing device, the computing device monitors the behavior of the application program (104). The behavior of the application program can include one or more of a number of different types of actions performed by the application program. For instance, the behavior can include when and for how long the application program communicates over a network, such as the Internet, to which the computing device is communicatively connected. In this respect, monitoring the behavior of the application program includes tracking each time the application program communicates over the network, and for each such time, when the communication was made, and for how long, which may be measured by the amount of data that the program sends or receives, for instance.

The behavior can include the types of data the application program accesses on the computing device, when and for how long the application program accesses the data, locations of the data the application program accesses, and how the application program accesses the data. The types of data may be divided among the various file formats in which the data is stored, such as image files, document files, and so on. The locations of the data may be the folders or directories of the storage device of the computing device, such as flash memory in the case of a mobile device like a smartphone. How the application program accesses the data can include whether the program is reading or writing the data, whether the program is accessing the data while the program is in the background and not actively being used as opposed to in the foreground and is actively being used, whether the program is accessing the data in direct response to a user action on the computing device or not, and so on.

The behavior can include the types of hardware resources the application program accesses, and when and for how long the application program accesses the hardware resources. Hardware resources of the computing device can include the storage device of the computing device, the networking hardware of the computing device, the image-capturing device of the computing device (i.e., the device's camera), the microphone of the computing device, and so on.

As such, depending on what is desired to be monitored as the profile of the application program, the computing device may add entries to a database corresponding to each access of a resource. An entry can include the date and time when the access was made, and the resource that was accessed. The entry can further include how long the access was for, such as the amount of data that was accessed, and so on.

The behavior of the application program is monitored for a period of time. The period of time thus elapses at some point (106). In one implementation, user specification can be initially provided as to how long the period of time is (108), or a default period of time may be specified, such that the period of time has elapsed (110). For example, the user may specify that the behavior of the application program be monitored for a number of hours, days, or weeks after initial installation of the application program. As such, within the period of time in this implementation, the application program remains unchanged from first installation until at least just after the specified period of time has elapsed; no update or patch is installed, in other words, to trigger elapsing of the period of time.

By comparison, in another implementation, the period of time is said to elapse when an update or patch is installed or applied to the application program (112). In this implementation, then, the period of time is not any particular length of time, but rather continues until an update or patch has been installed or applied. For example, many types of smartphones download application programs from a central "app store." This repository may notify the user of a smartphone that an application program currently installed on the device has been updated. Either automatically or as triggered by a user, the new version or update of the application program is downloaded and installed, which constitutes elapsing of the period of time.

Once the period of time has elapsed, a behavior profile of the application is constructed based on the monitored behavior of the application program from the time of installation and the elapsing of the period of time (114). In general, the behavior profile represents the monitored behavior of the application program. The behavior profile is constructed so that subsequent behavior of the application program can be compared against the behavior profile to determine whether the subsequent behavior deviates from the behavior profile (and thus differs from the behavior of the application program prior to elapsing of the period of time).

In one implementation, a statistical analysis can be performed on the monitored behavior to build the behavior profile of the application program (116). For example, from the entries of the database in which the behavior of the application program has been tracked, the frequency of access can be determined for various lengths of time, such as how many times access to the resource in question is made every hour, every day, and so on. The frequency of access may be specified for particular times of day, for particular usage scenarios (i.e., the application program running in the background or the foreground), and so on. The length of time in which a resource is accessed can be specified as a median or a mean. As such, the behavior profile represents how the application program has been behaving with respect to one or more different resources, so that future behavior can be compared against the profile. The results of the statistical test thus constitute the behavior profile.

In the same or another implementation, the behavior profile may be uploaded to a central computing device (118). For example, the computing device performing the method 100 may upload the behavior profile to a service provider, such as the manufacturer of the computing device. In return, the computing device can retrieve, or download, a composite (or second) behavior profile from this central computing device (120). The composite behavior profile is the behavior profile of the application program over a number of different users of the application program.

As such, the behavior profile against which subsequent behavior of the application program running on the computing device performing the method of FIG. 1 can be modified based on the behavior profile that is retrieved (122). As one example, if the composite behavior profile has been updated based on the behavior profile uploaded in part 118, the behavior profile may be modified in part 122 by simply replacing it with the composite behavior profile. As another example, the behavior profile may be modified by weighting the two behavior profiles. For example, a user may specify that 70% of the behavior profile may be that from the behavior profile constructed based on the monitored behavior of the application program running on the computing device performing the method 100, and 30% from the composite behavior profile. In this way, the user can determine to what extent the future behavior of the application program is compared against the prior behavior of the application program on the user's own computing device as opposed to other users' computing devices.

FIG. 2 shows an example method 200 that is performed following the method 100. The method 200 is an example of a proactive implementation to prevent the application program from engaging in subsequent behavior (after the elapsing of the period of time) that deviates from the previously constructed behavior profile. The method 200 is performed by the same computing device that performed the method 100.

Thus, after the elapsing of the period of time and after the behavior profile for the application program has been constructed, the computing device continues to monitor the behavior of the application program (202). In response to determining that the application program is attempting to engage in behavior that deviates from the behavior profile, the computing device prevents the application program from doing so (204). Therefore, this implementation is proactive in that it ensures that the application program does not engage in behavior that is outsides the auspices of the behavior profile.

For example, the behavior profile may be as simple as indicating the types of hardware resources that the application program accesses on the computing device. The behavior profile may indicate that the application program accesses the processor, the memory, the storage device, and the microphone of the computing device. Therefore, if the application program subsequently attempts to access the camera of the computing device, the computing device prevents the program from doing so.

As another example, the behavior profile may be more sophisticated, and specify that in a given day, the application program sends on average a certain amount of data over a network, within any thirty-day period. Subsequently, the application program after two days may have already reached this mean amount of data transmission. Therefore, the application program is prohibited from transmitting any further data over the network.

As a third example, the behavior profile may specify that the application program accesses the camera of the computing device while the program is running in the foreground. Subsequently, the application program attempts to access the camera while the program is running in the background, surreptitiously. Therefore, the computing device prevents the application program from accessing the camera while the program is running in the background.

The computing device can permit the user to enable behaviors that would otherwise result in deviation from the behavior profile and be prohibited (206). Stated another way, the user can be permitted to manually modify the behavior profile so that the application program can engage in certain behavior. As an example, the behavior profile may prohibit the application program from accessing the computing device's microphone. However, the application program may have functionality desired by the user that employs the microphone, which the user did not happen to use during the period of time when the program's behavior was monitored for constructing the behavior profile. Therefore, the user at a later point in time may be able to specify that the application program can use the microphone.

The method 100 in conjunction with the proactive approach of the method 200 can be advantageous to lock an application program's behavior to the behavior it exhibits during the first hours, days, or weeks in which the program is run after having been installed. For example, with some smartphone operating systems, application programs have to receive permission to access certain resources of the smartphone, such as the microphone, the camera, a user's calendar, the user's contacts, and so on. Many times, a user is eager to begin using a newly downloaded and installed application program, and simply gives consent to each such permission request the first time the application program is run, without a full understanding as to how exactly the application program will use the resources. In the proactive approach, such permission does not have to be requested by the application program upfront, and instead how the program is actually used by the user during the initial period of time governs the permissions accorded to the application program. As such, the permissions are effectively locked to the user's typical usage of the program, with additional permissions potentially being granted subsequently, once the user has had an opportunity to use the program.

FIG. 3 shows an example method 300 that is also performed following the method 100. The method 300 is an example of a reactive implementation to perform an action responsive to the application program engaging in subsequent behavior (after the elapsing of the period of time) that deviates from the previously constructed behavior profile. The method 300 is performed by the same computing device that performed the method 100.

Thus, after the elapsing of the period of time and after the behavior profile for the application program has been constructed, the computing device continues to monitor the behavior of the application program (302). In response to determining that the application program has engaged in behavior that deviates from the behavior profile, the computing device performs an action related to the application program (304). One difference between the proactive approach of FIG. 2 and the reactive approach of FIG. 3 is that in the former, the application program is prevented from engaging in the deviated behavior, whereas in the latter, the program is permitted to engage in the deviated behavior, and an action thereafter is performed.

Examples of actions that can be performed including the following. The user of the computing device can be notified that the application program is engaging in behavior that deviates from the previously constructed behavior profile (306). For example, if the application program's behavior profile indicates that the program transmits data over the network to a particular web site or server, and the program is now transmitting data to a different web site or server, the user may be notified by a message on the computing device of this behavior. Such behavior may be suspicious, for instance, and indicate that the application program is a gremlin program and has become a rogue application program.

Data regarding the deviation of the behavior of the application program from the behavior profile may be transmitted to a developer of the application program (308). In this respect, the deviation may indicate that the application program is not performing correctly. For example, the behavior profile may indicate that the application program when running in the foreground uses 25% of the processing resources of the computing device. If the application program, such as after an update or a patch has been installed, starts using 50% of the processing resources, this may indicate that there is a bug in the code of the program. The user of the computing device may not notice the increased usage of processing resources. By sending data to the developer, the developer can thus learn that his or her program may not be operating correctly.

The application program may be completely disabled following the deviation from the behavior profile, and the user requested to provide explicit authorization for the application program to be reenabled (and permitted to run again) (310). For example, the behavior profile may indicate that the application program does not transmit data to any given web site for more than ten seconds at a time. If the application program suddenly floods a web site continuously with data, the program may not be operating correctly, or the application program may be a gremlin program that is now participating in a distributed denial of service (DDOS) attack. As such, the application program may be disabled, with the user notified as to the behavior that resulted in disablement.

The method 100 in conjunction with the reactive approach of the method 300 can thus be advantageous to detect gremlin application programs or bugs in application programs, particularly as a result of an update or patch having been installed or applied to the program recently. A user may have successfully used an application program for a relatively long period of time and thus has over time learned to trust the program. The user further may have the computing device configured to automatically apply updates to the application program. An update to the application program may have been installed without the user's realization. The update may have transformed the application program into malware (i.e., the application program has become a gremlin program), or the update may be riddled with bugs. The reactive approach thus provides a mechanism to detect these occurrences.

It is noted that parts of the proactive approach of the method 200 can be used in the reactive approach of the method 300, and vice-versa. For example, the user's enablement of behavior so that it does not result in deviation from the behavior profile in part 206 can also be performed in the context of the method 300. As another example, the actions performed in parts 306, 308, and 310 can also be performed responsive to the application program attempting to engaged in behavior that deviates from the behavior profile in the context of the method 200.

FIG. 4 shows an example computing device 400. The computing device 400 may be a mobile computing device, such as a smartphone, or another type of computing device, such as a laptop or desktop computer, a tablet computing device, and so on. The computing device 400 includes at least a processor 402 and a non-transitory computer-readable data storage medium 404, as well as other hardware resources 406. The other hardware resources 406 may include networking hardware, graphics hardware, and so on.

The computer-readable medium 404 stores an application program 408 and computer-executable code 410, each of which is executable by the processor 402. The application program 408 is a program that a user of the computing device 400 downloads and installs on the device 400. Execution of the code 410 by the processor 402 causes the method 100 and the method 200 or 300 to be performed.

The techniques disclosed herein thus construct a behavior profile of an application program after installation of the program on a computing device, from monitored behavior of the program. After a period of time has elapsed, which may be specified period of time or which may be an unspecified period that elapses when an event like an update or a patch to the program being installed, the behavior of the program is continued to be monitored relative to the profile. In a proactive implementation, the application program is prevented from engaging in behavior that deviates from the behavior profile. In a reactive implementation, after the program engages in behavior that deviates from the profile, an action is performed.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
   after first installation of an application program on a computing device, monitoring, by the computing device, a behavior of the application program during execution of the application program for a period of time, the period of time expiring at least after execution of a plurality actions of the application program;
   building a behavior profile of the application program from the behavior, the behavior profile comprising behavior of the application program while executing the plurality of actions; and
   after expiration of the period of time, comparing behavior of the application program during execution of an additional action by the application program with execution behavior of the application program in the behavior profile;
   in response to determining that execution behavior of the additional action of the application program is attempting to deviate from execution behavior of the behavior profile performing one of:
      preventing, by the computing device, the application program from deviating from the behavior profile; and
      performing an action with respect to the application program.

2. The method of claim 1, wherein the period of time is a specified period of time, the specified period of time longer than an amount of time for the application program to execute a plurality of actions, the application program being unchanged from the first installation thereof to just after the specified period of time elapses.

3. The method of claim 2, further comprising: receiving, by the computing device, the specified period of time from a user of the computing device.

4. The method of claim 1, wherein the period of time is an unspecified period of time, elapsing of the specified period of time occurring when an update or patch of the application program is applied or installed.

5. The method of claim 1, wherein the behavior of the application program comprises when and for how long the application program communicates over a network to which the computing device is communicatively connected.

6. The method of claim 1, wherein the behavior of the application program comprises one or more of: types of data the application program accesses, when and for how long the application program accesses the data, locations of the data the application program accesses, and how the application program accesses the data.

7. The method of claim 1, wherein the behavior of the application program comprises one or more of: types of hardware resources the application program accesses, and when and for how long the application program accesses the hardware resources.

8. The method of claim 1, wherein building the behavior profile of the application program from the behavior of the application program comprises: performing a statistical analysis on the behavior of the application program that has been monitored for the period of time, wherein results of the statistical analysis constitute the behavior profile of the application program.

9. The method of claim 1, wherein building the behavior profile of the application program from the behavior of the application program comprises:
   retrieving a second behavior profile of the application program built from the behavior of the application program on one or more other computing devices; and
   modifying the behavior profile of the application program based on the second behavior profile.

10. The method of claim 1, further comprising, after preventing the application program from deviating from the behavior profile: permitting a user to enable a given behavior of the application program with respect to the behavior profile, and adding the enabled behavior to the behavior profile.

11. The method of claim 1, wherein performing the action with respect to the application program comprises one or more of:
    notifying, by the computing device, a user of the computing device that the behavior of the application program is deviating from the behavior profile;
    transmitting, by the computing device, data regarding a deviation of the behavior of the application program from the behavior profile to a developer of the application program; and
    disabling, by the computing device, the application program and requesting the user to provide explicit authorization for the application program to be reenabled.

12. A non-transitory computer-readable data storage medium storing computer executable code performable by a computing device to perform a method comprising:
    after first installation of an application program on the computing device, monitoring a behavior of the application program during execution of the application program for a specified period of time, the period of time expiring at least after execution of a plurality actions of the application program;
    constructing a behavior profile of the application program based on the behavior that has been monitored while executing the plurality of actions during the specified period of time;
    after expiration of the period of time, comparing behavior of the application program during execution of an additional action by the application program with execution behavior of the application program in the behavior profile; and
    in response to determining that execution behavior of the additional action of the application program is attempting to deviate from execution behavior of the behavior profile, preventing the application program from engaging in behavior that deviates from the behavior profile.

13. The non-transitory computer-readable data storage medium of claim 12, wherein the behavior of the application program comprises one or more of:
    when and for how long the application program communicates over a network to which the computing device is communicatively connected;
    types of data the application program accesses, when and for how long the application program accesses the data, locations of the data the application program accesses, and/or how the application program accesses the data; and
    types of hardware resources the application accesses, and/or when and for how long the application program accesses the hardware resources.

14. The non-transitory computer-readable data storage medium of claim 12, wherein the method further comprises, after constructing the behavior profile and before preventing the application program from engaging in behavior that deviates from the behavior profile:

uploading the behavior profile that has been constructed to a central computing device;

downloading from the central computing device a second behavior profile of the application program constructed from the behavior of the application program on one or more other computing devices; and modifying the behavior profile of the application program based on the second behavior profile.

15. A computing device comprising:

hardware resources, including a processor; and a non-transitory computer-readable data storage medium storing computer-executable code that is executable by the processor to:

after first installation of an application program on the computing device, monitor a behavior of the application program during execution of the application program for at least execution of a plurality actions of the application program;

after an update and/or patch of the application program has been applied or installed, construct a behavior profile of the application program from the behavior that has been monitored until the update or patch was applied or installed, the behavior profile comprising behavior of the application program while executing the plurality of actions; and after the behavior profile has been constructed, in response to determining that the behavior during execution of an additional action of the application program after the update or patch has been applied and/or installed deviates from the behavior profile, perform an action with respect to the application program.

16. The computing device of claim 15, wherein the behavior of the application program comprises one or more of:

when and for how long the application program communicates over a network to which the computing device is communicatively connected;

types of data the application program accesses, when and for how long the application program accesses the data, locations of the data the application program accesses, and/or how the application program accesses the data; and types of the hardware resources the application accesses, and/or when and for how long the application program accesses the hardware resources.

17. The computing device of claim 15, wherein the computer-executable code is executable by the processor to further, after the behavior profile has been constructed:

upload the behavior profile that has been constructed to a central computing device;

download from the central computing device a second behavior profile of the application program constructed from the behavior of the application program on one or more other computing devices; and modify the behavior profile of the application program based on the second behavior profile.

18. The computing device of claim 15, wherein the computer-executable code is executable by the processor to perform the action with respect to the application program by one or more of:

notifying a user of the computing device that the behavior of the application program is deviating from the behavior profile;

transmitting data regarding a deviation of the behavior of the application program from the behavior profile to a developer of the application program; and disabling the application program and requesting the user to provide explicit authorization for the application program to be reenabled.

19. The method of claim 1, wherein the period of time is non-zero.

20. The non-transitory computer-readable data storage medium of claim 12, wherein the period of time is non-zero.

* * * * *